Patented Aug. 22, 1944

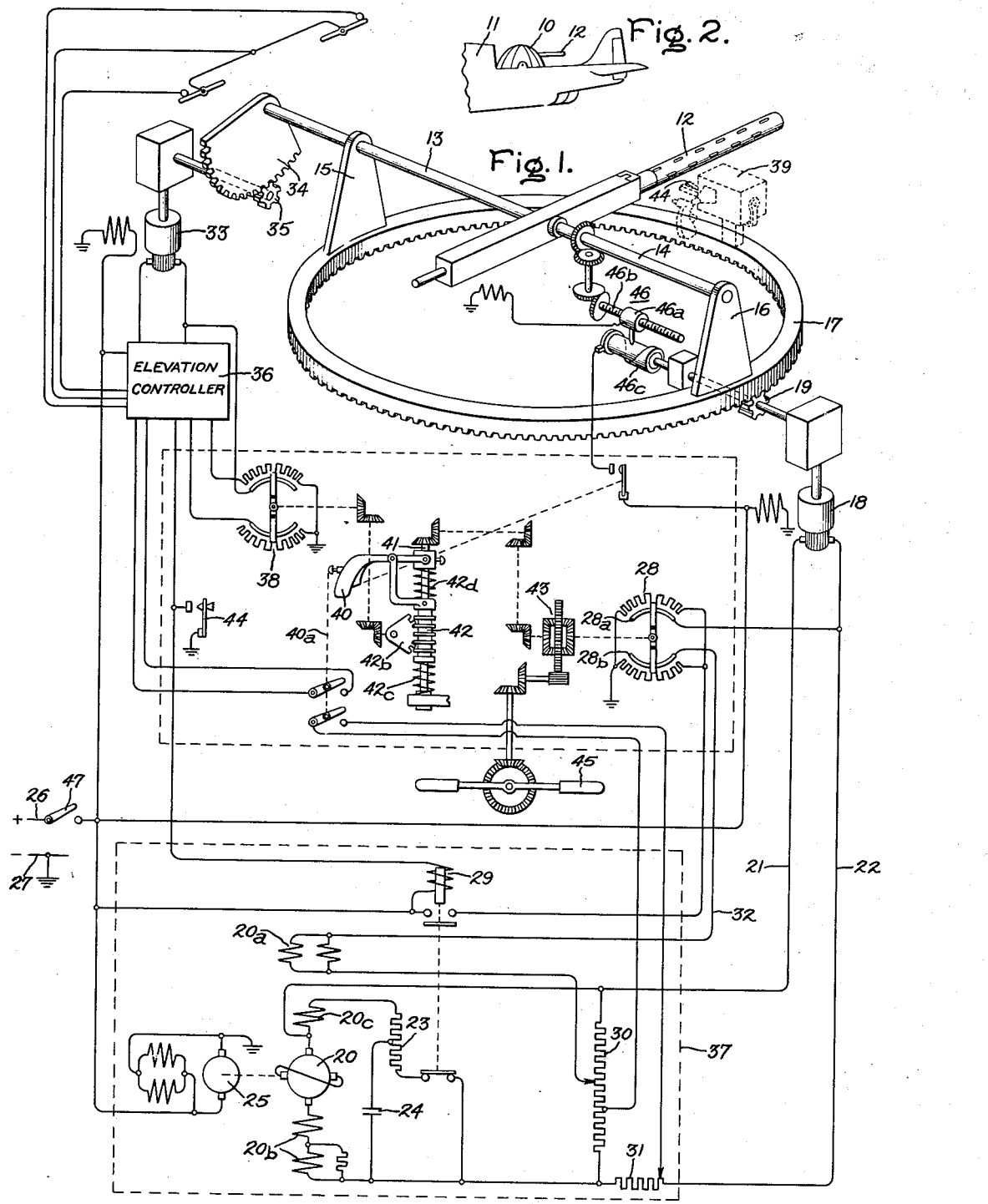

2,356,152

UNITED STATES PATENT OFFICE 2,356,152

TURRET CONTROL SYSTEM

Martin A. Edwards and Kenneth K. Bowman, Scotia, N. Y., assignors to General Electric Company, a corporation of New York Application November 28, 1941, Serial No. 420,792

7 Claims. (Cl. 172—239)

This invention relates to control systems, more particularly to control systems for turrets and the like, and it has for an object the provision of a simple, reliable, efficient and compact control system of this character for controlling the train and elevation movement over a wide range of speed.

A more specific object of the invention is the provision of a control system of this character in which movement of a manually operated member in one direction effects the movement in train, and movement of this member in a different direction effects the elevation movement.

A still more specific object of the invention is the provision of a means on the manually operated control element for effecting high speed operation of both the elevation and the train movement.

In carrying the invention into effect in one form thereof, an electric motor is provided for driving the turret in train and a second electric motor is provided for driving the turret in elevation. Each of these motors is supplied from a separate dynamoelectric machine having a control field winding. Means responsive to one of the movements of the manually operated control member are provided for producing a variable control voltage. A potentiometer is connected across the output terminals of the supply dynamoelectric machine for one of the motors, and electrical connections are provided for applying to the control field winding the difference between the control voltage and the voltage drop across a predetermined portion of the potentiometer. A resistor is connected in the loop circuit between the supply dynamoelectric machine and the armature of the drive motor and is also included in the electrical connections to the control field winding for the purpose of varying the calibration of the control in accordance with the RI drop in the armature circuit.

For a better and more complete understanding of the invention, reference should now be had to the following specification and to the accompanying drawing, in which Fig. 1 is a simple, diagrammatical illustration of an embodiment of the invention, and Fig. 2 is a diagrammatical sketch of an application of the invention.

Referring now to the drawing, a top gun turret 10 of a military aircraft 11 is provided with a machine gun 12 which it is desired to move both in train and elevation. The machine gun 12 is provided with trunnions 13 and 14 which are journaled in trunnion cradles 15 and 16 to provide for elevation of the gun. The trunnion cradles 15 and 16 are fixedly mounted on a rotating ring 17 which is arranged to be rotated in azimuth by suitable driving means illustrated as an electric motor 18. The rotating ring 17 may be geared to the motor 18 in any suitable manner. In the drawing the ring is illustrated as being provided with gear teeth which mesh with a pinion gear 19 which is driven by the motor 18.

Current is supplied to the train motor 18 from a special armature reaction excited dynamoelectric machine 20 to the load brushes of which the armature of the motor 18 is connected by means of conductors 21 and 22. This armature reaction excited machine 20 is provided with an additional pair of brushes on an axis that is displaced 90 electrical degrees from the load brushes and these additional brushes are short circuited as indicated in the drawing. The machine 20 is provided with a main control field winding $20_a$ which is arranged so that its magnetic axis coincides with the axis of the load brushes. The flux along this axis causes a current to flow in the short circuit, and this short circuit current causes the armature to produce a flux along the short circuit axis which generates the voltage that appears across the load brushes of the machine. The important characteristics of the armature reaction excited dynamoelectric machine 20 are its exceptionally high speed of response, and its exceptionally high amplification factor, i. e. ratio between the magnitude of the current flowing in the control winding and the current flowing in the output circuit of the machine.

The dynamoelectric machine 20 is provided with compensating field windings $20_b$ on the load axis of the machine which neutralize the armature reaction of the machine which results from the armature current which flows in the output circuit of the machine. These compensating field windings neutralize the load armature reaction substantially 100 per cent, and consequently the main control field winding $20_a$ is only required to produce the amount of flux necessary to cause current to flow in the short circuit. As a result, the magnitude of this control current is very small and this accounts for the high amplification factor of the machine.

For the purpose of preventing surges and overshooting, the machine 20 is provided with an antihunt field winding $20_c$ which is arranged on the load brush axis of the machine in such a manner as to act differentially with respect to the compensating field winding $20_b$ and it is connected across the load brushes of the machine through a portion of a resistor 23 and a capacitor 24.

The dynamoelectric machine 20 is driven by any suitable driving means such as the direct-current electric motor 25 which is supplied from a suitable direct-current source such as represented by the two conductors 26 and 27.

A control potentiometer 28 is connected across the direct-current source 26, 27 through the contacts of a contactor 29. Another potentiometer 30 is connected across the output brushes of the supply dynamoelectric machine 20. A voltage drop resistor 31 is connected in the armature circuit of dynamoelectric machine 20 and turret motor 18.

The upper stationary contact 28a of potentiometer 28 is connected to the conductor 22 which conducts the armature current between the dynamoelectric machine 20 and the motor 18, and the other stationary contact 28b of the potentiometer is connected by means of conductor 32 to the upper terminal of the control field winding 20a. The lower terminal of the main control field winding 20a is connected to the slider on the potentiometer 30. As a result of these connections, a voltage is applied to the main control field winding 20a of dynamoelectric machine 20 which is equal to the difference of the control voltage across the stationary contacts 28a and 28b and the voltage across the portion of the potentiometer 30 between the conductor 22 and the slider, increased by the voltage drop across a resistor 31. As a result of these connections, the dynamoelectric machine 20 is caused to generate a voltage which is proportional to the difference of the control voltage produced by the potentiometer 28 and the voltage across the predetermined portion of potentiometer 30 and as a further result, the motor 18 is caused to rotate at a speed proportional to this differential voltage. As previously pointed out, only a very small current is required to excite the control field winding 20a, and accordingly the voltage across the predetermined portion of the potentiometer 30 is closely regulated to the control voltage of potentiometer 28 and likewise, the speed of motor 18 is caused to correspond closely to the control voltage of potentiometer 28.

Since the voltage drop across the resistor 31 through which the current to the turret motor 18 flows is added to the voltage drop across the predetermined portion of potentiometer 30, the excitation of the control field winding 20a is compensated for the RI drop of the armature circuit and as a result, the speed regulation of the motor 18 is made independent of the load thereon.

For the purpose of elevating the machine gun 12, a second electric motor 33 is provided and this motor is geared to the trunnion 13 through sector and pinion gears 34 and 35. The motor 33 is supplied and controlled by means of apparatus 36 which is in all respects identical with the apparatus within the dotted rectangle 37 which supplies and controls the motor 18. Duplication of this apparatus is therefore omitted for the purpose of simplifying the drawing. The potentiometer 38 corresponds in function with the potentiometer 28 and produces the control voltage with respect to which the speed of the elevation motor 33 is regulated.

For the purpose of effecting and controlling the train and elevation movements of the turret, a manually operated master controller 39 is provided. This master controller 39 may be mounted in any convenient location within the turret. It is shown mounted on the azimuth ring gear 17.

As shown, the master controller 39 is provided with a pistol grip 40 which is pivotally mounted on a shaft 41. A sleeve 42 having a worm thread is slidably mounted on the shaft 41 and is connected by means of an L-shaped yoke to the arm of the pistol grip 40. The worm threads of the sleeve 42 mesh with a sector gear 42b which is mechanically coupled to the slider of the potentiometer 38. Springs 42c and 42d urge the sleeve 42 to a position such that the slider of the potentiometer 38 is in the central or zero voltage position when the grip 40 is released.

The shaft 41 is journaled in suitable bearings, (not shown), and is connected through suitable gearing to one of the input members of a differential gear 43 whose output gear is connected to the slider of the control potentiometer 28. It will thus be seen that if the pistol grip 40 is moved in a vertical direction, the slider of the train elevation control potentiometer 38 will be moved from its central position and similarly, if the pistol grip 40 is moved in a horizontal direction, the slider of the train control potentiometer 28 will be moved.

A "dead man" switch 44 is mounted in a suitable position on the master controller 39. Preferably, this "dead man" switch 44 is mounted on the left-hand side of the controller 39 so that it can be grasped by the left hand while the pistol grip 40 is being grasped by the right hand. The contacts of the "dead man" switch 44 are preferably included in the energizing circuit for the operating coils of the train control contactor 29 and the corresponding contactor of the elevation controller 36.

The second input element of the differential gear 43 is connected through gearing to a foot pedal 45 which is mounted in such a position in the turret that the operator may place his feet on the pedals when he is sitting in the normal position to operate the manual controller 39. This foot pedal 45 can be operated in a manner to supply the most of the control for the operation of the turret in train, thereby leaving only a small percentage of the control to be provided by operation of the operator's master controller 39. In other words, the master controller will be a vernier control and the pedal operated mechanism will be the coarse control.

In order to prevent the machine gun 12 from firing into the structure of the airplane, a contact mechanism 46 is provided in the circuit of the firing solenoid. This contact mechanism comprises a movable contact member 46a mounted on a lead screw 46b and a cam surface contact member 46c which cooperates with the contact member 46a. The lead screw 46b is connected to one of the trunnions of the gun, as shown, or to some other point of the elevation drive, and the cam member 46c is connected to the train drive pinion 19. The contact 46a moves along the lead screw when the gun 12 is elevated and the cam member 46c rotates as the turret is rotated in train. The shape of the surface of the cam contact 46c is such that it is not in contact with the contact member 46a whenever the gun 12 is in such a position that it could be fired into any part of the fuselage. As a result, when the gun is in such position, the circuit of the firing solenoid is interrupted and the gun cannot be fired.

With the foregoing understanding of the elements and their organization in the system, the operation of the system itself will readily be understood from the following detailed description. The energizing circuit for the operating coil of the train control contactor 29 is completed by grasping the "dead man" switch 44. This circuit is traced from the positive side of the source 26 through the line switch 47 (in the closed position thereof), operating coil of contactor 29, and contacts of "dead man" switch 44 to the opposite side of the source. As previously pointed out, a similar circuit is completed for the corresponding elevation control contactor in the controller 36. As a result, contactor 29 and the corresponding contactor in controller 36 close their main contacts to apply voltages to the train control potentiometer 28 and the elevation control potentiometer 38. Contactor 29 in picking up, opens its lower contacts to interrupt the connection of the antihunt field winding 20c of dynamoelectric machine 20 through resistor 23 to conductor 22.

The turret is rotated in train by moving the pistol grip to the right or to the left depending upon whether it is desired to rotate the turret to the right or to the left. The rotation of the pistol grip 40 in train will cause the slider of the train control potentiometer 28 to be rotated from its zero voltage position to a position in which a control voltage is applied to the stationary contacts 28a and 28b which is impressed upon the control field winding 20a of dynamoelectric machine 20. As a result of this, the dynamoelectric machine 20 will generate a voltage at its load brushes which will be applied to the train drive motor 18. This voltage is also applied to potentiometer 30 and consequently the voltage between the slider of the potentiometer and the junction point of the potentiometer 30 and resistor 31 will be subtracted from the control voltage of the potentiometer 28, and the control field winding 20a will be energized by the difference of these two voltages. A condition of balance will quickly be established with the train drive motor 18 operating at a speed proportional to the difference of the control voltage from the potentiometer 28 and the voltage derived from the potentiometer 30. As the gun 12 is brought to bear on the target, the operator ceases his lateral pressure on the pistol grip 40 and the slider of the control potentiometer 28 is returned to its central zero voltage position, with the result that the control field winding 20a of the dynamoelectric machine 20 is deenergized and the voltage supplied to the train drive motor 18 is reduced to zero. From the foregoing it will be clear that this same operation could have been produced by movement of the pedals 45 with the operator exerting only slight pressure on the pistol grip 40 thereby to cause the manual control to act as a vernier to assist in aiming the gun.

The elevation operation is identical with the operation in train with the exception that it is initiated by vertical movement of the pistol grip.

It may be desired to move the gun rapidly from its position bearing on one target to another position bearing on a new target. For this purpose a high speed switch 40a is mounted on the pistol grip 40. Depression of this high speed switch causes it to close its contacts and it will be noted that in closing its lower contacts, the RI drop compensating resistor 31 and a portion of the potentiometer 30 are excluded from the circuit of the control field winding 20a and the potentiometer 28. As a result, the dynamo-electric machine 20 must generate a higher voltage in order to bring about the balanced condition between the voltage derived from the potentiometer 30 and the voltage of the potentiometer 28. This higher voltage is applied to the train drive motor 18 and as a result, the motor is caused to operate at an increased speed. Preferably, the amount of resistance excluded from the circuit of the control field winding 20a is such that the speed of the motor 18 will be tripled.

The upper contacts of the high speed switch 40 perform a similar function with respect to the operation of the elevation motor 33.

The ease and accuracy of aiming the gun may be further increased by designing the potentiometers 28 and 38 to provide a nonlinear relationship between the effective amount of the potentiometer resistance and the position of the sliding contact. In other words, the resistance of both arms of each potentiometer is tapered from the center of each arm to the ends thereof so that the effective amount of resistance of each arm increases nonlinearly with respect to the displacement of the contact arm. Consequently, at relatively small displacements of the contact arm, a given increase in the displacement will produce a relatively small increase in the control voltage derived from the potentiometer, whereas at large displacements, the same increase in displacement will produce a much larger increase in the derived control voltage.

The result of this in terms of manipulation of the gun is that when only small movements of the gun are necessary to bring it to bear on the target, the speed can be reduced to a very low value, whereas when large movements are required, a high speed of movement is obtainable.

Although in accordance with the provisions of the Patent Statutes this invention is described as embodied in concrete form and the principle thereof has been explained together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States, is:

1. A turret control system comprising, in combination, an electric motor for driving the turret, a dynamoelectric machine for supplying said motor, a master control switch and means controlled thereby for producing a control voltage, a potentiometer connected across the terminals of said dynamoelectric machine, a resistor connected in series relationship between said dynamoelectric machine and said motor, and a control field on said dynamoelectric machine responsive to the difference of said control voltage and the voltage drop across a portion of said potentiometer and resistor for controlling said dynamoelectric machine to supply a corresponding voltage to said motor.

2. A turret control system comprising, in combination, an electric motor for driving the turret, a dynamoelectric machine for supplying said motor, a master control switch and means controlled thereby for producing a control voltage, a potentiometer connected across the terminals of said dynamoelectric machine, a resistor connected in series relationship between said dynamoelectric machine and said motor, a control field on said dynamoelectric machine responsive to the difference of said control voltage and the voltage drop across a portion of said potentiometer and resistor for controlling said dynamoelectric machine to supply a corresponding voltage to said motor, and a high speed switch for connecting said control field winding to be responsive to the difference of said control voltage and the voltage across a predetermined portion of said potentiometer.

3. A turret control system comprising in combination an electric motor for driving the turret, a dynamoelectric machine for supplying said motor, a master controller for said dynamo-electric machine comprising a manually movable member and a control potentiometer operated thereby for producing a control voltage, a second potentiometer connected across the output terminals of said dynamoelectric machine, and a control field winding on said dynamoelectric machine connected to be responsive to the difference of said control voltage and the voltage across a selectable portion of said second potentiometer for controlling said dynamoelectric machine to supply a corresponding voltage to said motor, a second field winding on said dynamoelectric machine, a switch on said master controller manually operable to one position to energize said control field winding and to deenergize said second field winding, and means biasing said switch to a second position to deenergize said control field winding and connect said second field winding for energization by the voltage of said machine in a direction opposite to the magnetization of said control field winding.

4. A turret control system comprising in combination an electric motor for driving the turret, supply means for said motor comprising a dynamoelectric machine provided with a control field winding and a second field winding connected across the output terminals of said dynamoelectric machine for magnetization in a direction opposite to the magnetization of said control field winding, a master controller having a manually movable member and a control potentiometer operated thereby for producing a variable control voltage, a second potentiometer connected across the output of said dynamoelectric machine and connections from said potentiometers to said control field winding for applying thereto a voltage proportional to the difference of said control voltage and the voltage across a selectable portion of said second potentiometer for controlling said dynamoelectric machine to supply a proportional voltage to said motor, and a hand grip switch on said master controller having a member manually movable to one position to energize said control field winding and to disconnect said second control field winding from said output terminals and movable in response to release of manual pressure to deenergize said control field winding and to connect said second field winding to said output terminals thereby to effect rapid reduction of the magnetization of said dynamoelectric machine to zero.

5. A turret control system comprising in combination an electric motor for driving the turret, supply means for said motor comprising a dynamoelectric machine provided with a control field winding, a source of voltage and a control potentiometer connected across said source, a second potentiometer connected across the output terminals of said dynamoelectric machine, connections from said potentiometers to said control field winding for controlling said machine to supply a voltage to said motor proportional to the difference of the voltages derived from said potentiometers, a foot operated member connected to said control potentiometer for effecting coarse control of said motor, and a manually operated member connected to said control potentiometer for effecting fine control of said motor.

6. A turret control system comprising in combination an electric motor for driving the turret, supply means for said motor comprising a dynamoelectric machine provided with a control field winding, a source of voltage and an adjustable control potentiometer connected across said source providing a control voltage, a second potentiometer connected across the output terminals of said dynamoelectric machine, electrical connections from said potentiometers to said control field winding for controlling said dynamoelectric machine to supply a voltage to said motor proportional to the difference of the voltages derived from said potentiometers, a mechanical differential device having its output member connected to said control potentiometer, a foot operated member connected to one input member of said differential device for effecting a coarse control of said motor, and a hand operated member connected to the second input member of said differential device for effecting fine control of said motor.

7. A turret control system comprising in combination, a drive unit for driving the turret in train, a second drive unit for driving in elevation, a second drive unit for driving the turret in train, each of said units comprising an electric motor, supply means therefor comprising an armature reaction excited dynamoelectric machine provided with a control field winding, a device for producing a variable control voltage, a potentiometer connected across the output circuit of said dynamoelectric machine, and connections from said control voltage device and said potentiometer for applying to said field control field winding a voltage proportional to the difference of said control voltage and the voltage across a predetermined portion of said potentiometer, a controller having a manually operated member movable in one direction to actuate one of said control voltage producing devices to effect rotation of said turret in train and movable in another direction to actuate the other of said control voltage producing devices to effect operation in elevation, and a high speed switch on said manually operable member for varying said predetermined portion of said potentiometer.

MARTIN A. EDWARDS.
KENNETH K. BOWMAN.